Dec. 22, 1925.

A. R. STEPHEN

ALMOND SHELLER

Filed Jan. 16, 1925

1,566,779

INVENTOR
Archibald R. Stephen
BY
ATTORNEY

Patented Dec. 22, 1925.

1,566,779

UNITED STATES PATENT OFFICE.

ARCHIBALD R. STEPHEN, OF LODI, CALIFORNIA.

ALMOND SHELLER.

Application filed January 16, 1925. Serial No. 2,821.

*To all whom it may concern:*

Be it known that I, ARCHIBALD R. STEPHEN, a citizen of the United States, residing at Lodi, county of San Joaquin, State of California, have invented certain new and useful Improvements in Almond Shellers; and I do declare the following to be a full, clear, and exact description of the same, reference being had to the accompanying drawings, and to the characters of reference marked thereon, which form a part of this application.

This invention relates to improvements in devices for shelling nuts of all kinds especially almonds.

The principal object of my invention is to provide a device for the purpose which will efficiently crack and remove the shells from the nuts in such a manner that breakage of the kernels is reduced to a minimum.

In the shelling of almonds, peanuts, fruit pits, etc. by means of the devices now available the breakage of the kernels has entailed a considerable loss by reason of the wastage of small parts broken off and by the chipping and abrading of the kernels. This mutilation of the kernels reduces their market value considerably, as the higher the proportion of whole kernels the higher is the market value thereof.

My device largely eliminates loss from the above named causes.

A further object of the invention is to provide a shelling device made in the form of an attachment especially adapted to be removably applied to a huller of the type shown in my Patents Nos. 1,359,766 and 1,405,726.

The construction of the shelling attachment is such that it may be installed in or removed from the huller in a very quick and easy manner without having to dismantle the entire huller or change any parts thereof. Therefore with one main machine either shelling or hulling operations may be carried out upon the placing on or removal of my shelling attachment from such machine.

The attachment also requires a minimum of power in its operation and will handle a considerable bulk of nuts.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
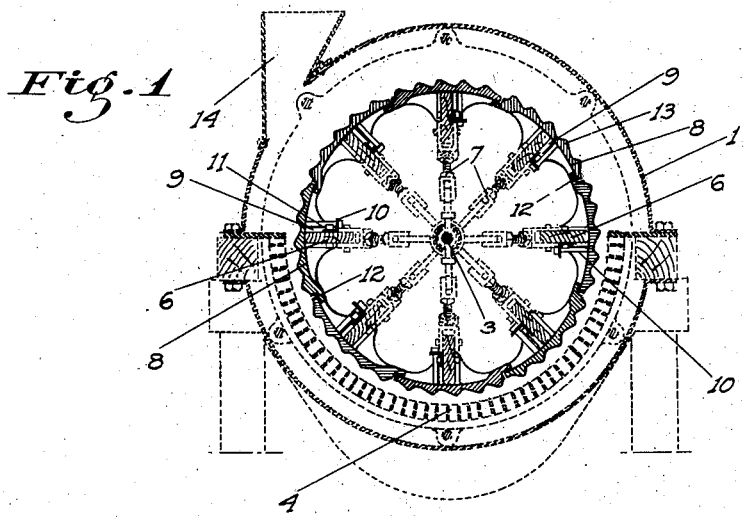
Fig. 1 is a sectional outline of an almond huller showing my shelling attachment applied thereto.
Figure 2:
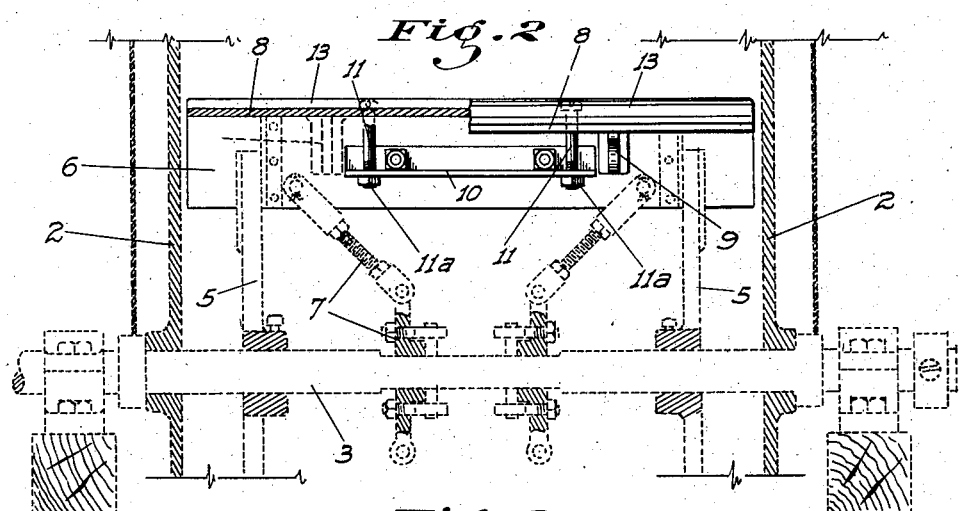
Fig. 2 is a fragmentary longitudinal section of the huller showing one of the shelling members as mounted on a beater board of the huller.
Figure 3:
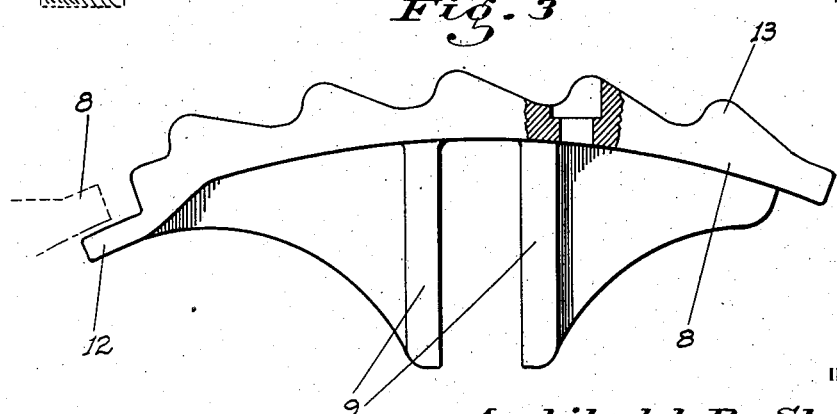
Fig. 3 is an end view of one of the shelling plates detached.

Referring now more particularly to the characters of reference on the drawings, the huller to which my shelling attachment is applied comprises essentially a cylindrical drum 1 having solid end walls 2, the drum being supported in horizontal position by suitable means. A horizontal shaft 3 driven in any desired manner projects through the drum axially thereof. Extending around and between the lower half of the walls 2 concentric with the shaft are narrow bars 4 spaced apart circumferentially a suitable distance, there being also a space between the bars and the adjacent surface of the drum proper.

Fixed on the shaft is a plurality of radial arms 5 which support beater boards 6 disposed radially of the shaft and extending lengthwise of the drum to within easy clearance of the walls 2. The boards are slidably mounted in the arms for limited radial movement, such movement being controlled by a link and adjustment mechanism indicated generally at 7 and which is fully described and covered in my Patent No. 1,405,726, hereinbefore mentioned.

The above parts in themselves form no part of the present invention and are merely described in order to show the relationship thereto of my shelling attachment now to be described.

This attachment comprises a number of circular plates 8, one for each board 6 and the same length as said boards. These plates are of equal length and when arranged in edge to edge relation form a continuous cylindrical drum.

Each plate is adapted to rest on the outer peripheral edge of one of the boards 6 and to maintain said plate in position on the board. Saddles 9 project inwardly and radially from the plate at suitable intervals and in common longitudinal alinement, these saddles being adapted to fit easily over the boards. To then hold the plates against any movement on the boards a bracket 10 is mounted on one face of each board between the saddles, the corresponding plate being then secured to the bracket by removable bolts 11 extending therebetween.

Each plate on one end has an extension ledge 12 which extends for the full length of the plate and is disposed to be overlapped by the adjacent end of an adjacent plate when the plates are mounted together on the various boards. These ledges prevent any nut meats or shells from passing inwardly of the plates where they would be confined and would probably accumulate. This structure is essential because the plates cannot be abutted snugly together owing to the necessary moving in and out of said plates with the adjustment of the boards for different sized nuts, and which adjustment of course causes the plates to be moved closer to or farther from the inner periphery of the bars 4, as will be evident.

The outer surfaces of the plates are provided with abrading elements in the form of integral and circumferentially spaced corrugations 13 preferably of smooth rounded contour which extend the full length of the plates. These corrugations are shaped so that they have a forward slope in the direction of the rotation of the shaft, which shape I have found produces the most efficient shelling results when said corrugations act in connection with the opposed abrading elements 4.

To install or remove the different plates the upper portion of the drum 1 is removed, which exposes the boards 6 for their full length. A plate is then installed on the uppermost board, the shaft is rotated somewhat to move another board uppermost, another plate is then mounted in position and so on. The nuts 11ª for the bolts 11 of the last plate to be installed would preferably be welded onto the corresponding bracket 10 and the bolts turned down into the nuts from above. Some such arrangement would be necessary because when that stage of the proceedings is reached it is impossible to insert a wrench inwardly of the plates owing to the fact that the plates then make a complete enclosure with the end walls 2. The brackets 10 when once installed may be left permanently attached to the boards without interference with hulling operations.

In operation, the nuts to be shelled are fed into the hopper 14 of the drum which is located in the upper portion and along the forward side thereof. The nuts then drop between the bars 4 and plates 8 and with the rotation of the latter the shells of the nuts are removed by the abrading action had by reason of the corrugations 13 and bars 4.

I have found that this arrangement works very successfully and from considerable use of the device in practice I have found that a very high percentage of whole and absolutely undamaged kernels will be had after the shelling operations are completed.

When the nuts have been shelled in the machine the shells and kernels fall between the bars 4 onto the bottom of the drum, from which they then pass by gravity to be then separated in any desired manner.

From the foregoing description it will be readily seen that I have produced such a device as substantially fulfills the objects of the invention as set forth herein.

While this specification sets forth in detail the present and preferred construction of the device still in practice such deviations from such detail may be resorted to as do not form a departure from the spirit of the invention, as defined by the appended claims.

Having thus described my invention what I claim as new and useful and desire to secure by Letters Patent is:

1. A nut shelling attachment for a nut hulling machine which includes a plurality of radially disposed beater boards, comprising a plurality of plates to form a complete drum, adapted to be mounted individually on the boards, said plates having abrading elements on their outer faces.

2. A nut shelling attachment for a nut hulling machine which includes a plurality of radialy disposed beater boards, comprising a plurality of plates to form a complete drum, adapted to enclose and be supported by the boards, said plates having abrading elements on their outer faces, and means for removably securing the plates to the boards individually.

3. A nut shelling attachment for a nut hulling machine which includes a plurality of radially disposed beater boards, comprising a plurality of plates to form a complete drum, adapted to enclose and be supported by the boards, said plates having abrading elements on their outer faces, and saddles projecting inwardly of the plates and adapted to straddle the boards.

4. A nut shelling attachment for a nut hulling machine which includes a plurality of radially disposed beater boards, comprising a plurality of plates to form a complete drum, adapted to enclose and be supported by the boards, said plates having abrading elements on their outer faces, saddles projecting inwardly of the plates and adapted to straddle the boards, and independent means between the plates and boards for holding the plates in definite but removable positions on the boards.

5. A nut shelling attachment for a nut hulling machine which includes a plurality of radially disposed beater boards, comprising a plurality of plates to form a complete drum, adapted to be mounted individually on the boards, and said plates having abrading elements on their outer faces, and a ledge on one end of each plate over which the adjacent end of an adjacent plate overhangs, whereby to prevent open cracks being formed between the plates when the latter are moved outwardly from a common center.

In testimony whereof I affix my signature.

ARCHIBALD R. STEPHEN.